United States Patent [19]

Cucinotta et al.

[11] Patent Number: 4,562,913

[45] Date of Patent: Jan. 7, 1986

[54] FRICTION CLUTCH DRIVEN PLATE

[75] Inventors: Luigi Cucinotta; Luigi Bambini, both of Castelbellino, Italy

[73] Assignee: Automotive Products plc, Leamington Spa, England

[21] Appl. No.: 559,100

[22] Filed: Dec. 7, 1983

[30] Foreign Application Priority Data

Dec. 10, 1982 [IT] Italy .................... 24663 A/82

[51] Int. Cl.[4] ............................................. F16D 3/14
[52] U.S. Cl. ........................... 192/106.2; 192/70.17; 464/68
[58] Field of Search ............... 192/106.1, 106.2, 70.17; 464/68

[56] References Cited

U.S. PATENT DOCUMENTS

| | | | |
|---|---|---|---|
| 4,024,938 | 5/1977 | Maucher | 192/106.2 |
| 4,044,874 | 8/1977 | Wörner | 464/68 X |
| 4,056,179 | 11/1977 | Huber | 192/106.2 |
| 4,185,728 | 1/1980 | Gatewood | 192/106.2 |
| 4,412,606 | 11/1983 | Loizean | 192/106.2 |
| 4,494,642 | 1/1985 | Hashimoto | 192/70.17 X |

FOREIGN PATENT DOCUMENTS

| | | | |
|---|---|---|---|
| 47583 | 3/1982 | European Pat. Off. | 192/106.2 |
| 1501465 | 11/1967 | France . | |
| 2503295 | 10/1982 | France | 192/106.2 |
| 2040398 | 8/1980 | United Kingdom | 192/106.2 |
| 2103760 | 2/1983 | United Kingdom | 192/106.2 |

*Primary Examiner*—Alan Cohan
*Assistant Examiner*—Stephen M. Hepperle
*Attorney, Agent, or Firm*—Kemon & Estabrook

[57] ABSTRACT

A friction clutch driven plate incorporates a hub, an intermediate drive plate connected to a flange of the hub through a toothed lost-motion connection and a friction facing carrier incorporating two side plates. Main torsion damping springs act between the intermediate plate and the side plates. Soft auxiliary torsion damping springing acts between the hub and the intermediate plate to damp out idle rattle. Location between the friction facing carrier and hub is provided by an inward extension of one side plate while the auxiliary springing is arranged adjacent the flange and inward of the other side plate to provide a compact construction.

14 Claims, 5 Drawing Figures

FRICTION CLUTCH DRIVEN PLATE

BACKGROUND OF THE INVENTION

This invention relates to friction clutch driven plates and particularly, but not exclusively, to driven plates which are utilised in the friction clutches of automobiles.

A problem associated with some automobiles is that during the periods when the transmission drive is under no load, rotary oscillations occur in the gearbox producing a phenomenon known as idle-rattle.

In order to damp out the vibrations which generate idle-rattle it is known to utilise a friction clutch driven plate in which the torque load through the driven plate passes through two sets of damping springs arranged in series with each other. Very light loads applied to the driven plate are taken through soft auxiliary vibration damping springing. When the limited angular movement controlled by the auxiliary damping springing has been taken up, normal drive load passes through a set of main torsion damping springs. In this way, very soft springing is provided over a limited range of movement for very light loads and this arrangement tends to prevent idle-rattle. Such a driven plate is known from French Patent Publication No. 1501465.

It is often important for a friction clutch driven plate to be compact in order to enable it to fit within a space available in an existing design of drive line or to assist in maintaining the combination of engine, clutch and gearbox as short as possible in a completely new design.

An object of the present invention is to provide a compact design of clutch driven plate having main torsion damping springs and auxiliary torsion damping springing.

SUMMARY OF THE INVENTION

According to the present invention there is provided a clutch driven plate comprising a hub, a friction facing carrier mounted on the hub co-axially therewith, incorporating two axially spaced side plates and capable of limited angular rotation about the hub, and an intermediate drive means mounted co-axially on the hub for limited angular rotation relative to both the hub and facing carrier, rotation of the facing carrier relative to the intermediate drive means being resisted by main torsion damping springs supported by the side plates, and rotation of the intermediate drive means relative to the hub being resisted by a softer auxiliary torsion damping spring connection, wherein the intermediate drive means extends outward from a lost motion connection with the hub to engage the main damping springs, an inward extension from one side plate to one side of the intermediate drive means provides location for the carrier with respect to the hub and the auxiliary connection is located inwardly of the other side plate adjacent the intermediate drive means.

Preferably the auxiliary springing comprises one member mounted on and secured against rotation with respect to the hub, another member connected to the intermediate drive means for rotation therewith and one or more auxiliary springs acting circumferentially between said members.

The hub may incorporate a flange having outwardly directed teeth which engage through a circumferential clearance with corresponding inwardly directed teeth of the auxiliary drive means. The inward extension from the side plate may then be held against the side of the flange, either directly or through an axially directed annular bearing member to assist location between the hub and the friction facing carrier.

The inward extension from the side plate may be a friction facing carrier plate extending inward from the friction facings, across the side plate and to the hub. Alternatively, the inward extension may be an integral part of a metal pressing incorporating the side plate.

There may be an axially directed annular bearing member interposed between said one side plate and the intermediate drive means. There may also be an axially directed annular bearing member and an axially directed annular spring between the intermediate drive means and the other side plate. The member of the auxiliary connection which is connected to the auxiliary drive means may have an outward extension passing between the axially directed annular spring and the associated annular bearing member to engage the intermediate drive means outward of said spring and bearing member.

At least one of the axially directed annular bearing members may be formed of a friction material to provide friction damping between at least two of the relatively rotatable parts of the driven plate.

The intermediate drive means may be dished such that it engages with a central region of the main torsion damping springs but is offset in a direction away from the auxiliary torsion damping spring connection to provide further space therefor.

BRIEF DESCRIPTION OF THE DRAWINGS

An embodiment of the invention will now be described by way of example only with reference to the accompanying drawings in which.

DESCRIPTION OF PREFERRED EMBODIMENTS

The driven plate incorporates a hub 11 splined at 10 for mounting on and driving a gearbox input shaft (not shown). Hub 11 incorporates an external radial flange 12 which is provided with outwardly directed teeth 13 around its periphery.

Figure 1:
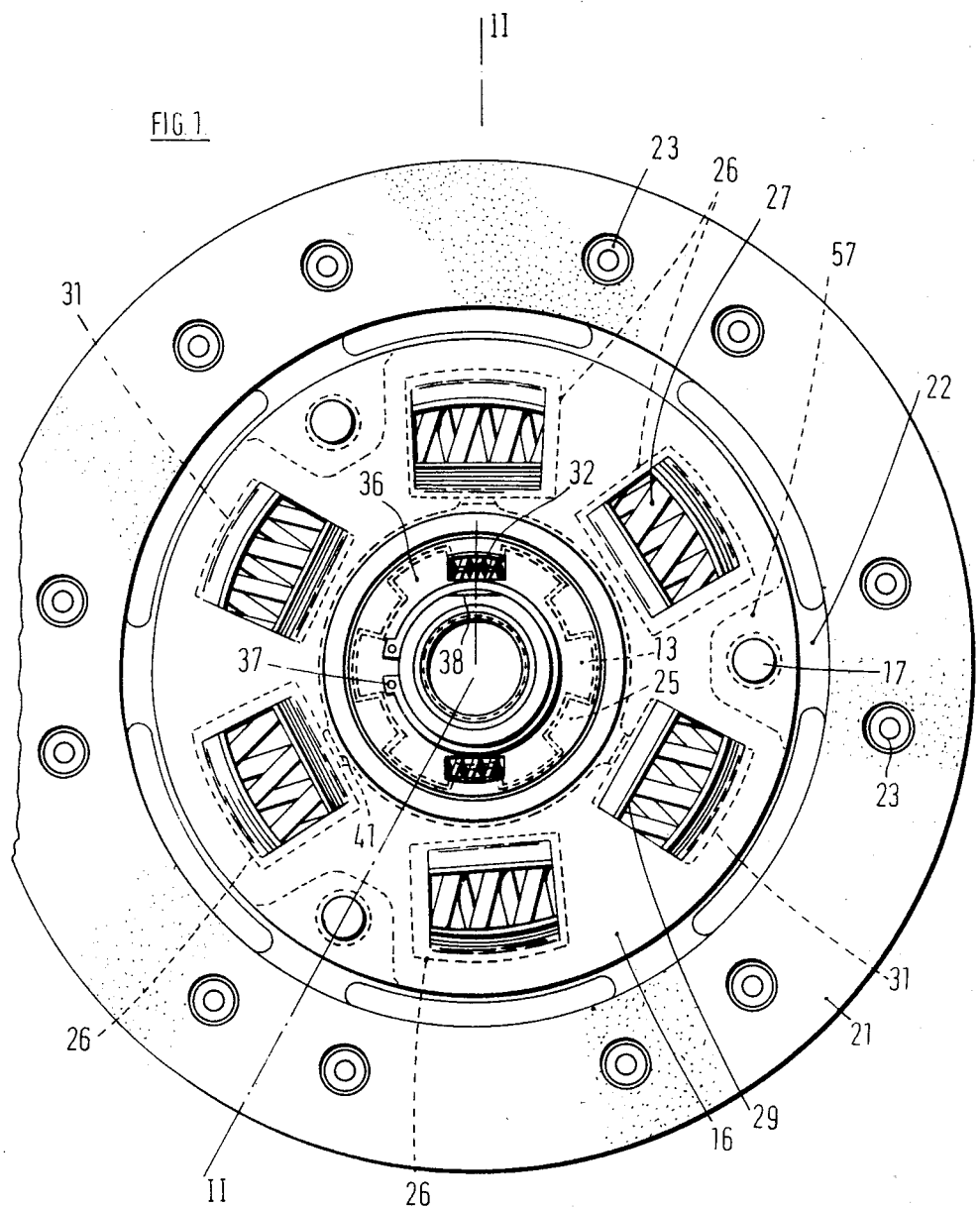
FIG. 1 is an end view of a friction clutch driven plate in accordance with the invention.

The clutch driven plate also incorporates a friction facing carrier 14 which in turn includes two axially spaced annular side plates 15 and 16 which are connected together by three equally spaced stop pins 17. The stop pins are in effect large shouldered rivets. A friction facing carrier plate 18 is held against the side plate 15 by being rivetted thereto by the stop pins 17. This carrier plate extends out beyond the side plates and carries around its outer periphery two annular friction facings 19 and 21. As seen in FIG. 1, carrier plate 18 is divided near its outer periphery into six segments 22 to which the friction facings are secured by rivets 23. Carrier plate 18 has an inward extension 20 beyond the side plate 15 and has a central aperture corresponding to the outer diameter of the hub 11 so that it acts as a guide for constraining the friction facing carrier with respect to the hub.

A driving connection between the friction facing carrier 14 and the hub 11 includes an intermediate drive means constituted by a plate 24 which will hereinafter be referred to as the intermediate plate. The intermediate plate is generally annular and around its inner periphery incorporates inwardly directed teeth 25 which mesh, by way of a circumferential clearance best seen in FIG. 1, with the outwardly directed teeth 13 of the hub 11. The clearance provides a lost-motion connection betwen hub and intermediate plate which in this example allows relative movement of 6°.

Figure 2:
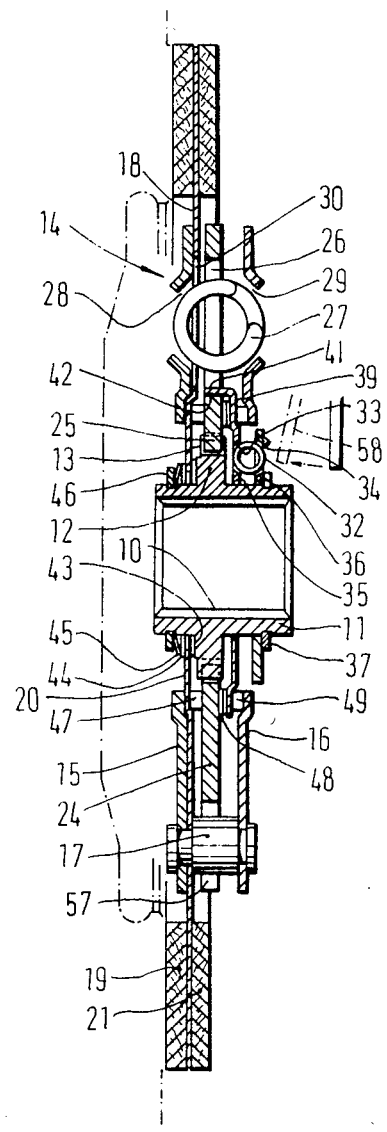
FIG. 2 is a cross-section on line II—II of FIG. 1.

The intermediate plate is also provided with six circumferentially directed windows such as the window 26 of FIG. 2 which receive main torsion damping springs 27. Torsion damping springs 27 are also received in windows 28 and 29 in the side plates 15 and 16 respectively. Openings 30 in the carrier plate 18 provide clearance to allow springs 27 to engage in windows 28. These windows are formed partly by removal of material from the side plates and partly by bending out the edges of the windows to provide location for the torsion damping springs. As can be seen in FIG. 1, there are four windows 26 in intermediate plate 24 which are longer than the corresponding springs in the side plates and there are two windows 31 in the intermediate plate which are of the same length as the windows in the side plates. The main torsion damping springs 27 in the windows 26, 28, 29 and 31 constitute a driving connection between the friction facing carrier 14 and the intermediate plate 24 which operates in a manner to be described subsequently.

The driven plate also incorporates auxiliary torsion damping spring connection between the intermediate plate 24 and the hub 11 to control the relative angular rotation between the hub and the intermediate plate which is permitted by the teeth 13 and 25. This connection is effected by two circumferentially directed diametrically opposed auxiliary springs 32 which, as shown in FIG. 2, are arranged in windows in plate members 35 and 36 respectively. Plate member 36 closely surrounds the hub 11, is held onto the hub by means of a circlip 37 and is held against rotation with respect to the hub by virtue of a flat 38. Plate member 35 is freely rotatable on the hub 11 but has an outward annular extension 39 terminating in bent over lugs 41 which engage in notches 42 at the inner edges of three of the windows 26 and 31 to provide a positive driving connection between plate member 35 and the intermediate plate 24. Thus the auxiliary springs 32 provide a driving connection between the intermediate plate 24 and the hub 11 through the intermediary of the plate members 35 and 36. The significance of this driving connection and its relationship with the main driving connection through springs 27 will be described subsequently.

The relative location of the friction facing carrier, hub and intermediate member includes several axially directed annular bearing members and associated axially directed annular springs. In particular, the inner extension of the carrier plate 18 of friction facing carrier 14 is spaced from the flange 12 by a bearing member 43 and is held in position by another bearing member 44, an axially directed annular spring 45 and a circlip 46 providing reaction for spring 45. This arrangement provides location between the hub 11 and friction facing carrier 14.

An annular bearing member 47 is interposed between side plate 15 (or strictly speaking carrier plate 18 which lies against this side plate) and intermediate plate 24. On the opposite side of intermediate plate 24, an annular spring 48, the plate member 35 and a bearing member 49 are interposed between the intermediate plate 24 and side plate 16. By this means, the intermediate plate is located axially with respect to the friction facing carrier 14 and the plate member 35 is also located axially.

Figure 3:
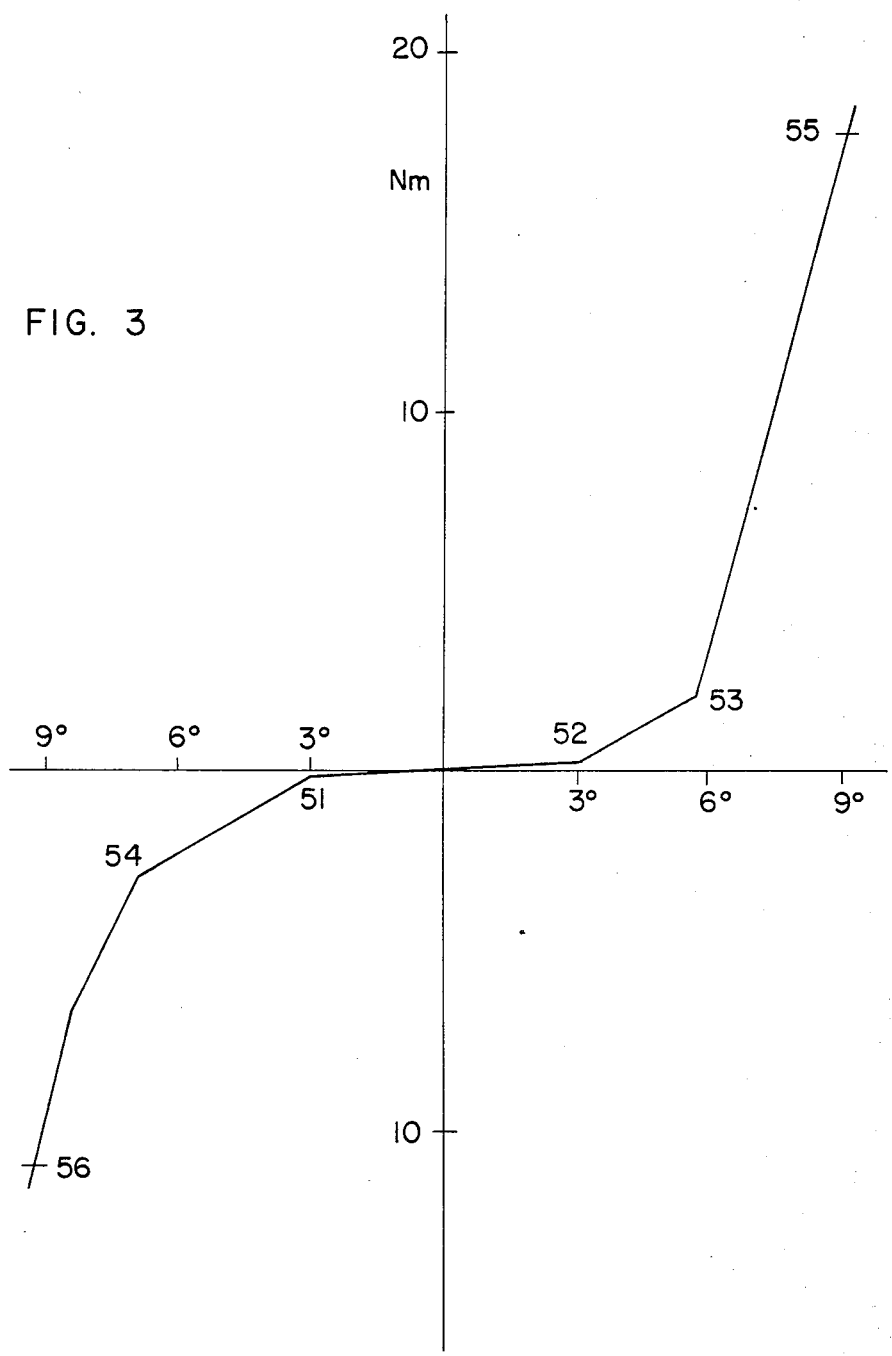
FIG. 3 is a graph showing the relationship between applied torque and the angular displacement between the hub and friction facing carrier of the clutch driven plate of FIGS. 1 and 2.

The arrangement described allows limited angular movement between the hub and the intermediate plate and between the intermediate plate and the friction facing carrier under the control of torsion damping springs. The nature of this movement as torque is applied to the friction facings of the friction facing carrier from an engine for transmission through the hub to a gearbox will now be described, making reference to FIG. 3 as well as to FIGS. 1 and 2. First of all, it should be explained that the main and auxiliary torsion damping springs hold the components of the driven plate in the rotational positions shown, with clearance for movement in both angular directions. When a light load or small displacement is applied to the carrier 14, this is transmitted through the two springs in windows 31 to intermediate plate 24 and from the intermediate plate 24 through auxiliary springs 32 to the hub. Because the springs 32 are much softer than springs 27, there is a direct drive without spring compression through the springs 27 and the initial angular movement occurs between intermediate plate and hub under the control of auxiliary springs 32. This is the situation for movement up to 3° in either direction as allowed by the cooperating teeth 13 and 25 of the hub and intermediate plate respectively. FIG. 3 is a torque deflection characteristic of the driven plate and this movement of 3° in either direction is represented by the portion of the characteristic between points 51 and 52. After this movement of 3° in either direction, teeth 13 and 25 allow no further relative rotation between hub and intermediate member so the torque required to produce further deflection increases more rapidly because this deflection is associated with compression of the two springs 27 in windows 31. This range of deflections is represented by the positions between points 52 and 53 and between points 51 and 54 in FIG. 3. Once point 53 has been reached, edges of all six windows 26 and 31 are in contact with their respective springs 27 and have to compress these springs to cause further movement. This is represented by the steeper portion of the characteristic between points 53 and 55. For load in the opposite direction, the springs in windows other than 31 come into operation progressively with further deflection as represented by the fact that the characteristic increases in steepness in two steps between points 54 and 56. Points 55 and 56 represent the positions at which the stop pins 17 have come into contact with the edges of apertures 57 in the outer periphery of the intermediate plate 24 and at that stage no further relative rotation between hub and friction facing carrier is possible.

The characteristic illustrated in FIG. 3, with a high degree of flexibility between points 51 and 52 and greater stiffness with further deflection has been found to be particularly advantageous in suppressing idle-rattle. Under no-load or very low-load conditions, the very soft or flexible part of the characteristic between points 51 and 52 is in operation. During normal driving conditions, the part of the characteristic between points 52 and 55 is used and for overrun conditions the relevant part of the characteristic is between points 51 and 56.

When the driven plate is to be used with a diaphragm spring clutch, it is particularly important to ensure that the axial length of the driven plate, just outward of the hub, is not unduly great. This is to provide clearance for the inner ends of the fingers of the diaphragm spring during clutch release. A typical requirement for the extreme position of a diaphragm spring finger is shown in ghost at 58 and it can be seen that despite the presence of the auxiliary springs, the driven plate does not encroach on the space required for the diaphragm spring. One reason for this is that the auxiliary springs are disposed adjacent the flange 12 and intermediate plate 24 and are surrounded by side plate 16. In a more conventional design, side plate 16 would approach closely to the hub and leave no space for the auxiliary spring connection.

One or more of the bearing members 43, 44, 47 or 49 may be made of a friction material so as to provide a significant degree of friction between the relatively rotatable parts of the driven plate and thus assist in the damping out of vibrations. Generally, some friction damping is desirable in conjunction with the movement controlled by the main torsion damping springs whereas very low friction is normally desirable in association with the movement controlled by the auxiliary friction damping springs.

Figure 4:
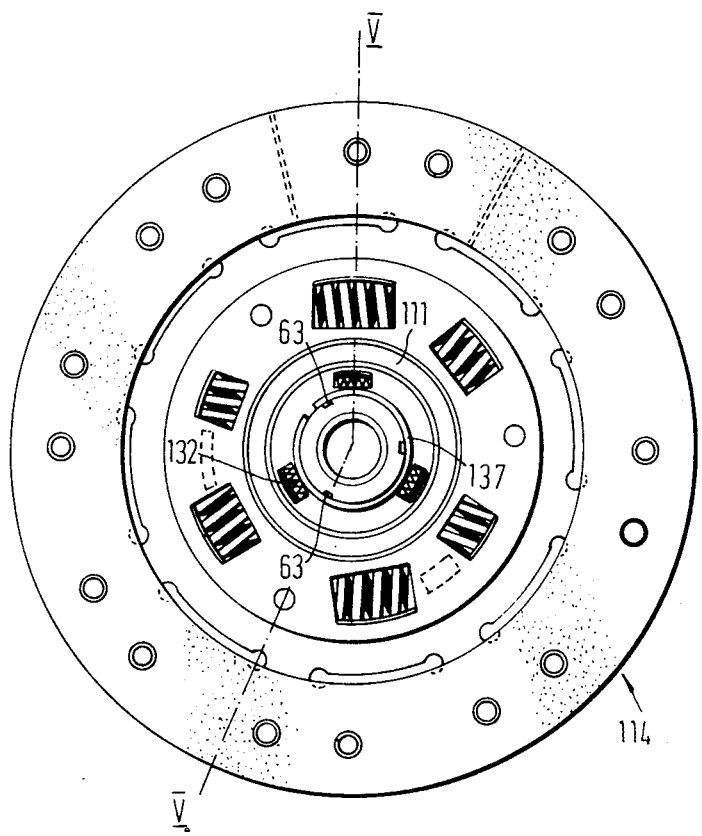
FIGS. 4 and 5 are views corresponding to FIGS. 1 and 2 but showing a modified friction clutch driven plate.
Figure 5:
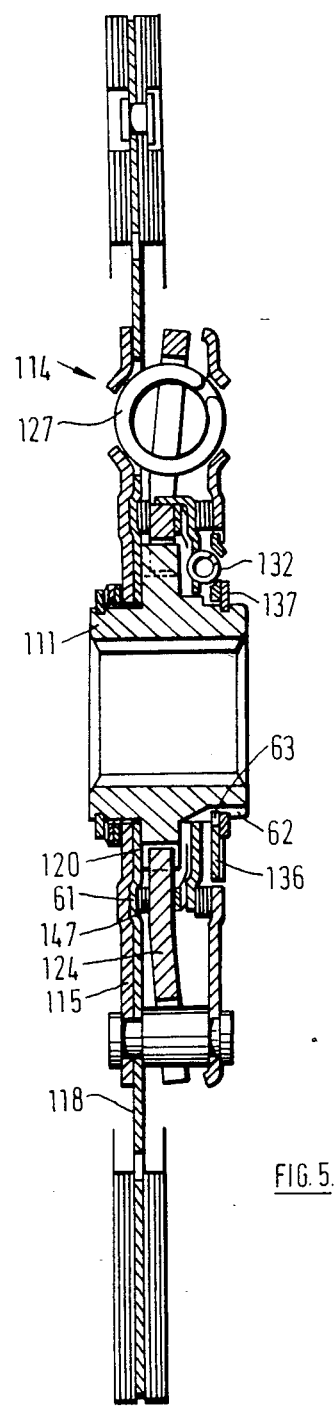

FIGS. 4 and 5 are views corresponding to FIGS. 1 and 2 but showing various modifications. Those parts of the driven plate shown in FIGS. 4 and 5 which correspond to FIGS. 1 and 2 will not be described in detail.

One primary feature as best seen in FIG. 5 is that the intermediate drive means or intermediate plate 124 is of dished configuration with a flat inner portion and an angled outer portion. The outer dished portion passes substantially through the centre of each of the main torsion damping springs 127 while the effective offset near the centre of the intermediate plate in a direction away from the auxiliary springs 132 assists in retaining the compact design.

A second modification shown in FIGS. 4 and 5 is that side plate 115 extends inward alongside the inward extension 120 of the carrier plate 118 such that the inner region of the side plate acts in conjunction with the inward extension of the carrier plate to help locate the friction facing carrier 114 with respect to the hub 111. The carrier plate 118 and side plate 115 also together have an inwardly directed annular groove 61 in which the bearing member 147 is located.

The embodiment of FIGS. 4 & 5 also incorporates three auxiliary springs 132 in place of the two springs 32 in FIGS. 1 and 2. A modified location for the plate member 136 is also provided as compared with that for plate member 36. The hub incorporates three axially extending slots 62 into which inwardly extending tongues 63 of the plate 136 extend. Axial location is still by means of a circlip 137 corresponding to circlip 37.

In a still further modification, side plate 115 alone may form the inward extension, in which case the carrier plate 118 may either terminate just inward from its connection to the side plate 115 or may be replaced by a series of outwardly directed segments rivetted to the outer periphery of the carrier and carrying the friction facings.

We claim:

1. A clutch driven plate comprising: a hub; a friction facing carrier mounted on the hub co-axially therewith and comprising two axially spaced side plates and connecting means uniting said side plates together; an intermediate drive means mounted on the hub co-axially therewith; a first driving connection operative between the intermediate drive means and the carrier allowing limited angular rotation therebetween; a second driving connection operative between the hub and the intermediate drive means allowing limited angular rotation therebetween; main torsion damping springs supported by the side plates and acting between said intermediate drive means and carrier to control angular movement therebetween; the intermediate drive means extending outward between the side plates from its driving connection with the hub to engage the main damping springs; an auxiliary torsion damping spring connection operative between said hub and intermediate drive means to control angular movement therebetween; an inward extension from one side plate to one side of the intermediate drive means providing co-axial location for the carrier with respect to the hub; the other side plate terminating at an inner periphery thereof spaced radially outwardly from said hub, thereby defining an annular recess in said driven plate exteriorly of said hub, beside said intermediate drive means and interiorly of said other plate; the auxiliary spring connection being located within said recess.

2. A clutch driven plate according to claim 1 wherein the auxiliary spring connection comprises one member mounted on and secured against rotation with respect to the hub, another member connected to the intermediate drive means for rotation therewith and at least one auxiliary spring acting circumferentially between said members.

3. A clutch driven plate according to claim 1 wherein said second driving connection incorporates a flange on the hub having outwardly directed teeth and corresponding inwardly directed teeth on the intermediate drive means, spaces defined between the teeth allowing the limited angular rotation.

4. A clutch driven plate according to claim 3 wherein the inward extension from the side plate is held against the side of the flange to assist location between the hub and the friction facing carrier.

5. A clutch driven plate according to claim 4 further comprising an axially directed annular bearing member interposed between the extension and the flange.

6. A clutch driven plate according to claim 1 wherein the inward extension from the side plate is a friction facing carrier plate extending inward from friction facings, across the side plate to the hub.

7. A clutch driven plate according to claim 1 wherein the inward extension from the side plate comprises an integral part of a metal pressing incorporating the side plate.

8. A clutch driven plate according to claim 1, further comprising an axially directed annular bearing member interposed between one of said side plates and the intermediate drive means.

9. A clutch driven plate according to claim 8 further comprising an axially directed annular bearing member and axially directed annular spring interposed between the intermediate drive means and the other of said side plates.

10. A clutch driven plate according to claim 8 wherein a member of the auxiliary spring connection connected to the intermediate drive means has an outward extension passing between the axially directed annular spring and the associated annular bearing member and engaging the intermediate drive means outward of said spring and bearing member.

11. A clutch driven plate according to claim 5 wherein said axially directed annular bearing member is formed of a friction material to provide friction damping between at least two of the relatively angularly movable parts of the driven plate.

12. A clutch driven plate according to claim 8 wherein said axially directed annular bearing member is formed of a friction material to provide friction damping between at least two of the relatively angularly movable parts of the driven plate.

13. A clutch driven plate according to claim 9 wherein said axially directed annular bearing member is formed of a friction material to provide friction damping between at least two of the relatively angularly movable parts of the driven plate.

14. A clutch driven plate according to claim 1 wherein said intermediate drive means is dished such that it engages with a central region of the main torsion damping springs but is offset in a direction away from the auxiliary torsion damping spring connection to provide further space therefor.

* * * * *